No. 886,647. PATENTED MAY 5, 1908.
F. SCHLETH.
SIGHTING TELESCOPE.
APPLICATION FILED JUNE 18, 1906.
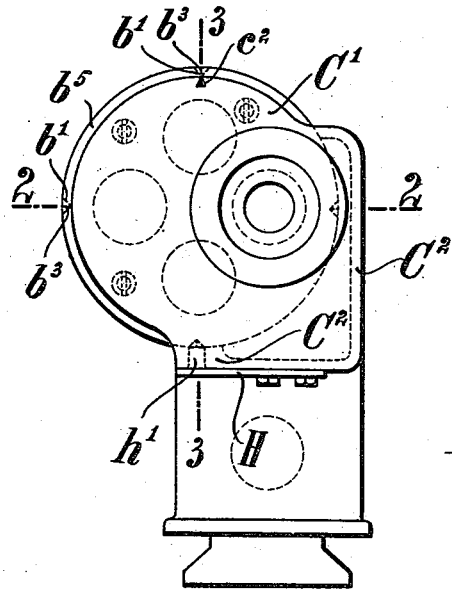
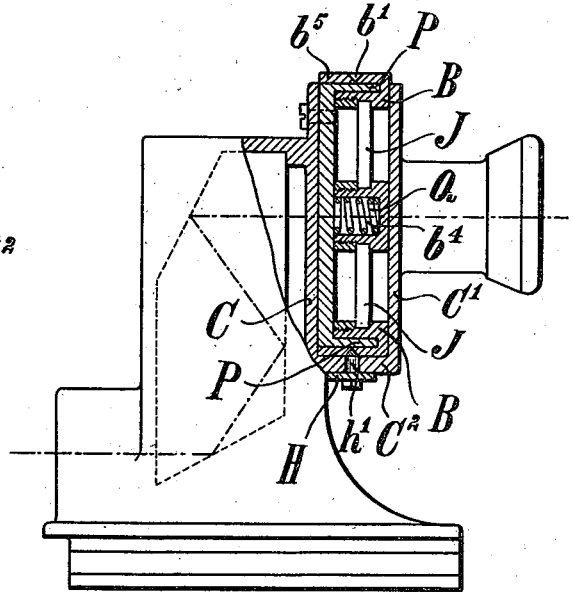
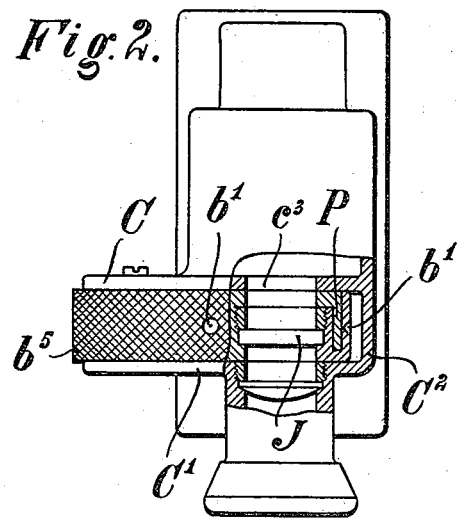
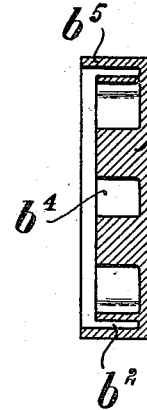
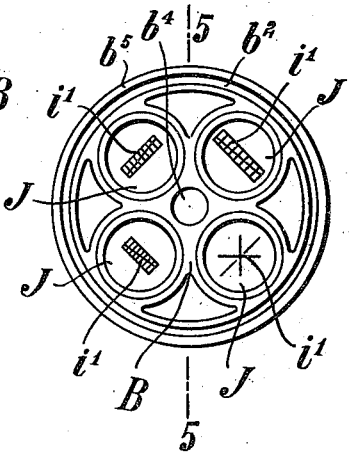

UNITED STATES PATENT OFFICE.

FRIEDRICH SCHLETH, OF ESSEN-ON-THE-RUHR, GERMANY, ASSIGNOR TO FRIED. KRUPP AKTIENGESELLSCHAFT, OF ESSEN-ON-THE-RUHR, GERMANY.

SIGHTING-TELESCOPE.

No. 886,647.  Specification of Letters Patent.  Patented May 5, 1908.

Application filed June 18, 1906. Serial No. 322,344.

*To all whom it may concern:*

Be it known that I, FRIEDRICH SCHLETH, a subject of the Emperor of Germany, and a resident of Essen-on-the-Ruhr, Germany, have invented certain new and useful Improvements in Sighting-Telescopes, of which the following is a specification.

The present invention relates to sighting telescopes having a plurality of sighting marks as described in the U. S. Patent No. 785,894, and the object of the invention is to provide a telescope of this kind which is of very condensed and simple construction and which is easily manipulated.

One embodiment of the subject of the present invention is shown by way of illustration in the accompanying drawing, in which—

Figure 1 is a rear view of the telescope; Fig. 2 is a top view of the same, partly in section on the line 2—2, of Fig. 1; Fig. 3 is a side view, partly in section on the line 3—3, of Fig. 1; Fig. 4 is a detail, and Fig. 5 is a section on the line 5—5 of Fig. 4.

The construction and optical operation of the telescope—in the present case illustrated by a prismatic telescope—are well known, and, therefore, do not need to be described.

In the housing of the telescope and in the proximity of the rear focal plane of the objective is provided a chamber which is formed by the walls C and C′, and by the wall $C^2$ connecting these walls, the walls C and C′ being at right angles to the optical axis of the ocular. In this chamber, a cylindrical bush B (shown separately in Figs. 4 and 5) is mounted in such a manner that it can be rotated about an axis that is parallel to the optical axis of the ocular. To that end a flanged disk P is secured to the wall C of the chamber and having its flange fitting in an annular groove $b^2$ in the bush B. The size of the walls C C′, and the length of the wall $C^2$ are so selected that only the wall $b^5$ of the bush B projects outside of the chamber, the amount of projection being approximately two-thirds of the periphery of the wall. The wall $b^5$ is milled on its outer surface. The bush B is provided with a central bore $b^4$ in which is arranged a helical spring Q having one end abutting against the bottom of the flanged disk P, while its other end presses the bush B against the wall C′ of the telescope-housing to hold the bush in frictional engagement with the wall C′. The wall C of the telescope-housing is provided with a perforation $c^3$ (Fig. 2), which alines with the ocular and permits access of the rays of light to the ocular. Four circular glass-plates are arranged in the bush B at the same angular distance from one another. The centers of the glass-plates are located in a circle which has its center coinciding with the turning axis of the bush B and the radius of which is equal to the distance between the axis of the ocular and the turning axis of the bush. The plates J carry suitable sighting marks $i'$ which are arranged on the surfaces opposing the objective and which are located in the rear focal plane of the objective.

The above-described arrangement makes it possible to bring each of the sighting marks successively into the sighting field of the telescope by turning the bush B. In order to facilitate the adjustment of the sighting marks, the bush carries four correspondingly designated line-marks $b^3$ and the telescope-housing is provided with an indicator $c^2$, the marks $b^3$ and the indicator $c^2$ being arranged in such a manner, relatively to one another, that every time a line-mark $b^3$ registers with the indicator $c^2$ the corresponding sighting mark is located in the sighting field of the telescope. In order to yieldingly secure the bush B in any of these positions, a spring H, having a locking pin $h'$ is arranged on the wall $C^2$ of the telescope-housing, the pin $h'$ having a conical point which can engage correspondingly arranged conical notches $b'$ in the mantle $b^5$ of the bushing B.

When it is desired to use a certain sighting mark, the operator grasps the milled mantle $b^5$ which projects outside of the telescope-housing, and he turns the bush B until the indicator $c^2$ registers with the line-mark $b^3$ that corresponds to the sighting mark, and the locking pin $h'$ passes into the corresponding notch $b'$. The sighting mark to be used is now located in the sighting field of the telescope. In other respects the mode of operation and the manipulation of the sighting telescope is well known.

In spite of the fact that the arrangement is so selected that the bush B can be adjusted directly by hand, the above-described peculiar mounting of the bush provides for a dust-proof closure for the parts of the bush that are located in the interior of the telescope-housing.

Having thus described the invention, what I claim as new therein is:

1. In a sighting telescope, the combination with a telescope housing, an ocular and an objective both mounted in said housing, of a rotatable bushing arranged in the rear focal plane of the objective and having its periphery located partly outside of the housing to be engaged by the hand of the operator; said bushing carrying a plurality of sighting marks arranged in a circle and adapted to be successively brought into the sighting field of the telescope.

2. In a sighting telescope, the combination with a telescope housing, an ocular and an objective both mounted in said housing, of rotatable means arranged in the rear focal plane of the objective and having its periphery located partly outside of the housing for direct rotary adjustment; said means carrying a plurality of sighting marks arranged in a circle and adapted to be successively brought into the sighting field of the telescope.

3. In a sighting telescope, the combination with a telescope housing, an ocular and an objective both mounted in said housing, of a rotatable bushing arranged in the rear focal plane of the objective and having its periphery located partly outside of the housing to be engaged by the hand of the operator, and means for holding the bushing in frictional engagement with said housing; said bushing carrying a plurality of sighting marks arranged in a circle and adapted to be successively brought into the sighting field of the telescope.

4. In a sighting telescope, the combination with the ocular, the objective, and the housing formed with a chamber adjacent to the ocular, of a bush rotatably arranged in one wall of said chamber, and means for holding the bush in frictional engagement with the opposite wall of the chamber; said bush being provided with a plurality of sighting marks adapted to be brought successively into the sighting field of the telescope, and the bush having a milled outer surface partly exposed to be engaged by the hand of the operator.

5. In a sighting telescope, the combination with the housing having open sides, of a flanged disk secured to one wall of the housing, an annular grooved bush fitted on the flange of the disk and provided with a plurality of sighting marks, and a milled wall projecting through the open sides of the housing, and a spring interposed between the disk and the bush.

The foregoing specification signed at Dusseldorf this twenty-eighth day of April, 1906.

FRIEDRICH SCHLETH.

In presence of—
WILLIAM ESSENWEIN,
ALFR. POHLMEYER.